(12) United States Patent
Prevo et al.

(10) Patent No.: US 7,071,643 B2
(45) Date of Patent: Jul. 4, 2006

(54) DUAL SPEED QUAD BRUSH TWO POLE MOTOR SYSTEM

(75) Inventors: Justin M Prevo, Mason, MI (US); Cynthia L Moore, Onondaga, MI (US); Joseph R Butler, Albion, MI (US)

(73) Assignee: Fasco Industries, Inc., Eaton Rapids, MI (US)

( * ) Notice: Subject to any disclaimer, the term of this patent is extended or adjusted under 35 U.S.C. 154(b) by 0 days.

(21) Appl. No.: 10/946,290

(22) Filed: Sep. 21, 2004

(65) Prior Publication Data

US 2006/0061311 A1 Mar. 23, 2006

(51) Int. Cl.
*H02K 23/20* (2006.01)

(52) U.S. Cl. ............... 318/268; 318/280; 318/541; 388/836; 310/148

(58) Field of Classification Search ........... 318/268, 318/564, 9, 439, 106, 541; 310/239, 68 R, 310/220; 388/839, 836
See application file for complete search history.

(56) References Cited

U.S. PATENT DOCUMENTS

| 3,631,273 | A | * | 12/1971 | Stein | 310/309 |
| 3,662,201 | A | * | 5/1972 | Madsen | 310/220 |
| 3,815,004 | A | * | 6/1974 | Sommeria | 318/440 |
| 4,095,155 | A | * | 6/1978 | Brooks et al. | 318/541 |
| 4,264,847 | A | * | 4/1981 | Sanders et al. | 388/839 |
| 4,426,562 | A | * | 1/1984 | Kemeny | 218/117 |
| 4,500,819 | A | * | 2/1985 | Trusock et al. | 318/106 |
| 5,023,532 | A | * | 6/1991 | Gakenholz | 318/541 |
| 5,089,735 | A | * | 2/1992 | Sawaguchi et al. | 310/88 |
| 5,134,351 | A | * | 7/1992 | Msihid | 318/541 |
| 5,311,615 | A | * | 5/1994 | Couetoux | 388/836 |
| 5,473,227 | A | * | 12/1995 | Arnaud et al. | 318/139 |
| 5,485,049 | A | * | 1/1996 | Shannon et al. | 310/248 |
| 5,522,653 | A | * | 6/1996 | Fulks et al. | 303/162 |
| 5,594,290 | A | * | 1/1997 | Shannon et al. | 310/251 |
| 5,602,957 | A | * | 2/1997 | Wille et al. | 388/836 |
| 5,604,654 | A | * | 2/1997 | Wille et al. | 361/23 |
| 5,610,456 | A | * | 3/1997 | Wille et al. | 310/58 |
| 5,623,177 | A | * | 4/1997 | Dimatteo et al. | 310/242 |
| 5,729,064 | A | * | 3/1998 | Noguchi et al. | 310/68 R |
| 5,744,890 | A | * | 4/1998 | Yamaguchi et al. | 310/248 |
| 5,877,573 | A | * | 3/1999 | Oberheide | 310/180 |
| 5,949,173 | A | * | 9/1999 | Wille et al. | 310/220 |
| 6,031,306 | A | * | 2/2000 | Permuy | 310/67 R |
| 6,680,596 | B1 | * | 1/2004 | DeCicco | 318/439 |
| 6,713,932 | B1 | * | 3/2004 | Shiina et al. | 310/239 |
| 6,791,290 | B1 | * | 9/2004 | Toth et al. | 318/564 |
| 6,822,354 | B1 | * | 11/2004 | Naman | 310/68 C |
| 6,838,799 | B1 | * | 1/2005 | Caiozza | 310/190 |

(Continued)

FOREIGN PATENT DOCUMENTS

JP 58157387 * 9/1983

(Continued)

*Primary Examiner*—Paul Ip
(74) *Attorney, Agent, or Firm*—Baker & Daniels

(57) ABSTRACT

A motor system includes four brushes electrically connected to a rotor. A stator includes two magnetic poles. A circuit selectively rotates the rotor at a first speed by applying a first voltage to a first of the brushes and a second voltage to a second of the brushes. The circuit selectively rotates the rotor at a second speed by applying the first voltage to the first brush or the second brush, and applying the second voltage to a third of the brushes and/or a fourth of the brushes.

20 Claims, 4 Drawing Sheets

U.S. PATENT DOCUMENTS

2002/0117915 A1* 8/2002 Shina et al. .................. 310/71
2003/0034746 A1* 2/2003 Toth et al. .................... 318/9
2004/0195927 A1* 10/2004 Naman ..................... 310/239

FOREIGN PATENT DOCUMENTS

JP 58157387 A * 9/1983
JP 2002119031 A * 4/2002

* cited by examiner

DUAL SPEED QUAD BRUSH TWO POLE MOTOR SYSTEM

BACKGROUND OF THE INVENTION

1. Field of the Invention

The present invention relates to DC motor systems and, more particularly, to dual speed DC motor systems.

2. Description of the Related Art

Dual speed DC motor systems are used in a variety of applications including automotive systems. Conventional dual speed DC motor systems include either three brushes or the standard two brushes along with an electronic controller, such as a pulse width modulation controller. A problem with the typical three brush systems used in dual speed applications is that they produce a biased performance when switching between clockwise rotational direction and counterclockwise rotational direction. For example, the motor speed in the clockwise direction may be substantially different from the motor speed in the counterclockwise direction, which is undesirable in many applications. Another problem with three brush systems is that the difference between the low speed and the high speed may be less than desired. The use of an electronic controller is also a sub-optimal solution because of the cost of the controller and the space occupied thereby.

What is needed in the art is a dual speed DC motor system that does not require an electronic controller, that has substantially the same performance in either rotational direction, and that has an increased speed differential between the low speed and the high speed.

SUMMARY OF THE INVENTION

The present invention provides a dual speed DC motor system including four brushes and two poles. Voltages can be selectively applied to different combinations of the four brushes to achieve two different motor speeds with a relatively large speed differential between the two speeds. Both the low and the high speed are achievable in either rotational direction.

The invention comprises, in one form thereof, a motor system including four brushes electrically connected to a rotor. A stator includes two magnetic poles. A circuit selectively rotates the rotor at a first speed by applying a first voltage to a first of the brushes and a second voltage to a second of the brushes. The circuit selectively rotates the rotor at a second speed by applying the first voltage to the first brush or the second brush, and applying the second voltage to a third of the brushes and/or a fourth of the brushes.

The present invention comprises, in another form thereof, a motor system including four brushes electrically connected to a rotor. A stator includes two opposing permanent magnet poles. A circuit selectively rotates the rotor at a first speed by applying a first voltage to a first subset of the brushes and a second voltage to a second subset of the brushes. The circuit selectively rotates the rotor at a second speed by applying a third voltage to a third subset of the brushes, and applying a fourth voltage to a fourth subset of the brushes.

The present invention comprises, in yet another form thereof, a motor including a stator having two permanent magnets. A first end of a first of the magnets opposes a first end of a second of the magnets. A second end of the first magnet opposes a second end of the second magnet. Four brushes are disposed between the magnets. A first of the brushes is disposed approximately midway between the first end and the second end of the first magnet. A second of the brushes is disposed approximately midway between the first end and the second end of the second magnet. A third of the brushes is disposed proximate the first end of the first magnet and the first end of the second magnet. A fourth of the brushes is disposed proximate the second end of the first magnet and the second end of the second magnet.

An advantage of the present invention is that a relatively expensive pulse width modulation electronic controller is not necessary to control the motor speed.

Another advantage is that the motor performance is substantially the same in either rotational direction for both the low speed and the high speed. That is, there is less directional bias than in known systems.

Yet another advantage is that there is a relatively large speed differential between the low speed and the high speed. Thus, a lower performance, relatively inexpensive armature may be used while still being able to meet high speed requirements.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
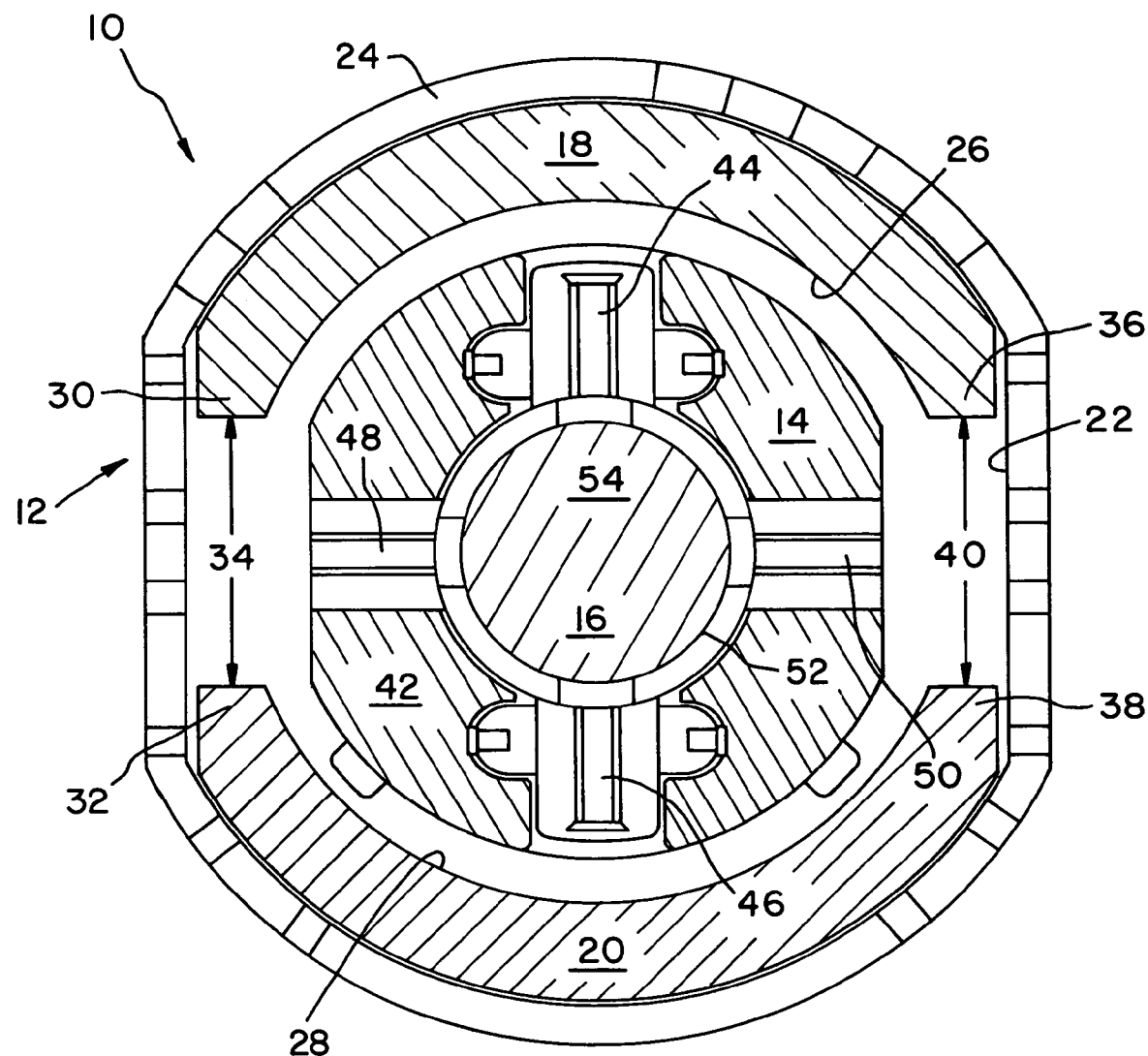
FIG. 1 is a cross sectional view of one embodiment of a motor of the present invention.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DESCRIPTION OF THE PRESENT INVENTION

FIG. 1 illustrates one embodiment of a motor 10 of the present invention including a stator 12, a brush assembly 14 and a rotor 16. Stator 12 includes two poles in the form of a first permanent magnet 18 and a second permanent magnet 20, both of which are adhered or other affixed to an inner surface 22 of a shell or case 24. Magnets 18, 20 function to provide an electric field within case 24. Alternatively, magnets 18, 20 may be replaced by electromagnetic windings, as is well known. The opposing magnets 18, 20 are both arcuate and have respective concave surfaces 26, 28 facing brush assembly 14. Magnet 18 has a first end 30 opposing a first end 32 of magnet 20. A gap 34 separates first ends 30, 32. Similarly, magnet 18 has a second end 36 opposing a second end 38 of magnet 20. A gap 40 separates second ends 36, 38.

Brush assembly 14 includes a brush card or brush holder 42 retaining a first brush 44, a second brush 46, a third brush 48, and a fourth brush 50. Each of brushes 44, 46, 48 and 50 is electrically connected to rotor 16. For example, each of brushes 44, 46, 48 and 50 may be biased against a circumferential face 52 of a circular commutator 54 of rotor 16 by a respective one of four springs (not shown). In one embodiment, commutator 54 includes ten bars or segments (not shown) along its circumferential face 52 such that each of brushes 44, 46, 48, 50 is electrically connected to a respective one or two of the segments at all times.

The four brushes 44, 46, 48 and 50 may be substantially evenly spaced around a circumference of commutator 54. That is, brushes 44 and 46 may be diametrically opposed to one another, and brushes 48 and 50 may also be diametrically opposed to one another such that brushes 44, 46, 48 and 50 are spaced from each other by approximately 90°.

In the embodiment shown in FIG. 1, first brush 44 is disposed approximately midway between first end 30 and second end 36 of first magnet 18. Second brush 46 is disposed approximately midway between first end 32 and second end 38 of second magnet 20. Third brush 48 is disposed proximate first end 30 of first magnet 18 and first end 32 of second magnet 20. Fourth brush 50 is disposed proximate second end 36 of first magnet 18 and second end 38 of second magnet 20. More particularly, third brush 48 may be disposed midway along gap 34, and fourth brush 50 may be disposed midway along gap 40.

Figure 2A:
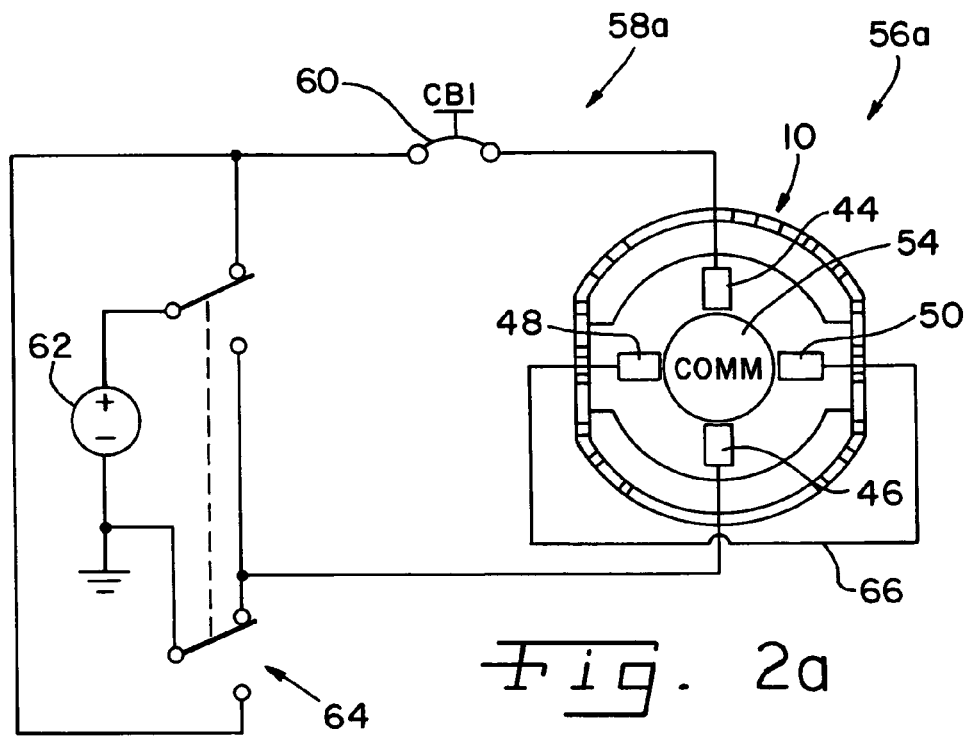
FIG. 2a is a schematic diagram of one embodiment of a motor system of the present invention, including the motor of FIG. 1, configured to operate at a first speed in a first rotational direction.

FIG. 2a illustrates a motor system 56a including a circuit 58a for operating motor 10 at a first, lower one of two possible speeds at which motor 10 may be operated. Circuit 58a includes a thermal protection device in the form of a circuit breaker 60 connected in series with brush 44. In another motor system 56b including a circuit 58b (FIG. 2b) for operating motor 10 at a first, lower one of two possible speeds, circuit breaker 60 is connected in series with brush 46. Systems 56a, 56b differ only in this respect, and circuits 58a, 58b also differ only in this respect.

Figure 2B:
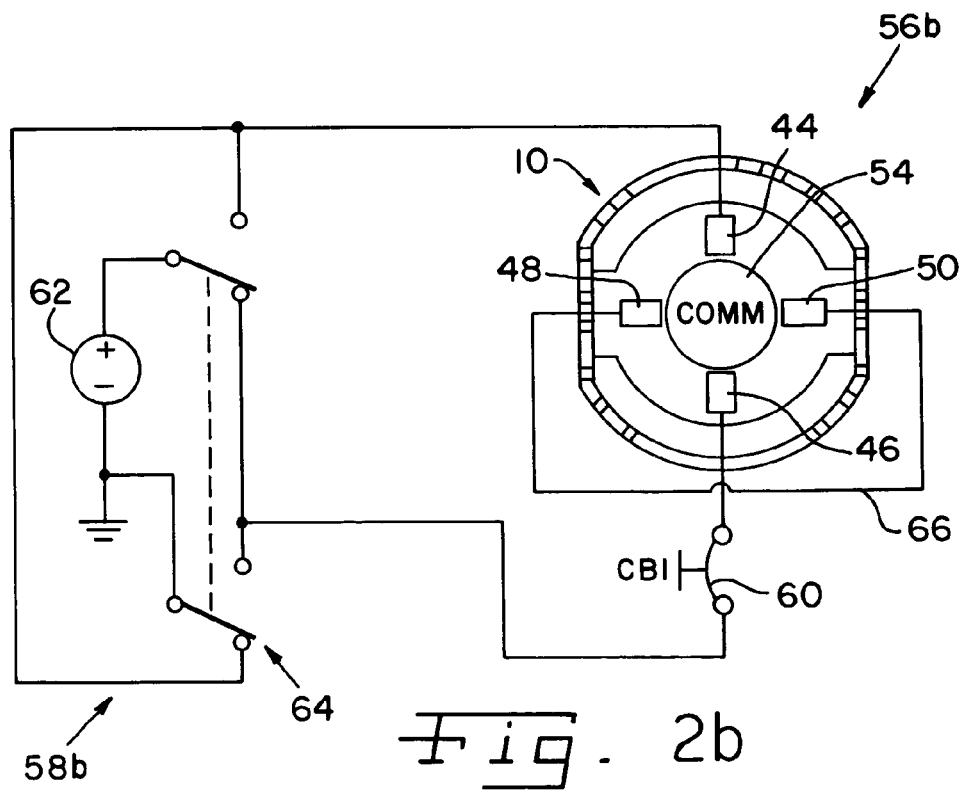
FIG. 2b is a schematic diagram of another embodiment of a motor system of the present invention configured to operate at the first speed in a second rotational direction.

Each of circuits 58a, 58b includes a DC power supply 62 for applying a DC voltage across brushes 44, 46. Circuits 58a, 58b also may include a double pole double throw (DPDT) switch 64 for selectively reversing the voltage applied to brushes 44, 46. DPDT switch 64 is shown in FIG. 2a in a first position in which a positive DC voltage is applied to brush 44, and a ground voltage is applied to brush 46. Motor 10 rotates at the first, lower speed in a first rotational direction, such as clockwise, when switch 64 is in the first position. In contrast, when DPDT switch 64 is switched to a second position, as shown in FIG. 2b, a positive DC voltage is applied to brush 46, and a ground voltage is applied to brush 44. Motor 10 rotates at the first, lower speed in a second rotational direction opposite to the first rotational direction, such as counterclockwise, when switch 64 is in the second position. Advantageously, motor 10 may rotate at approximately equal speeds in either rotational direction at the first, lower speed.

Regardless of the position of switch 64, brushes 48, 50 are electrically connected to each other by line 66 and are connected in parallel to commutator 54. However, power supply 62 does not directly apply voltage to either of brushes 48, 50.

Figure 3A:
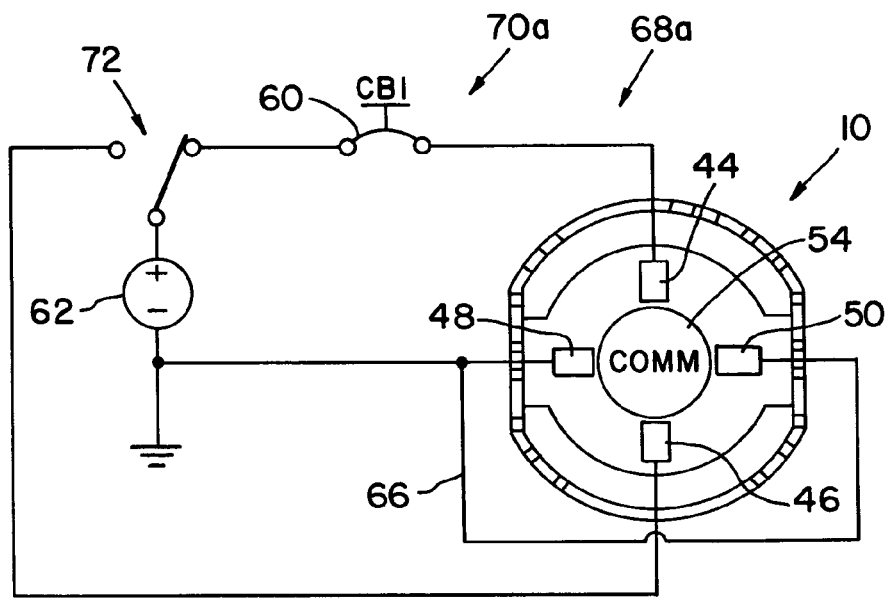
FIG. 3a is a schematic diagram of yet another embodiment of a motor system of the present invention configured to operate at a second speed in the first rotational direction.

FIG. 3a illustrates a motor system 68a including a circuit 70a for operating motor 10 at a second, higher one of the two possible speeds at which motor 10 may be operated. Circuit 70a includes a thermal protection device in the form of a circuit breaker 60 connected in series with brush 44. In another motor system 68b including a circuit 70b (FIG. 3b) for operating motor 10 at a second, higher one of the two possible speeds, circuit breaker 60 is connected in series with the parallel combination of brushes 48, 50. Systems 68a, 68b differ only in this respect, and circuits 70a, 70b also differ only in this respect.

Figure 3B:
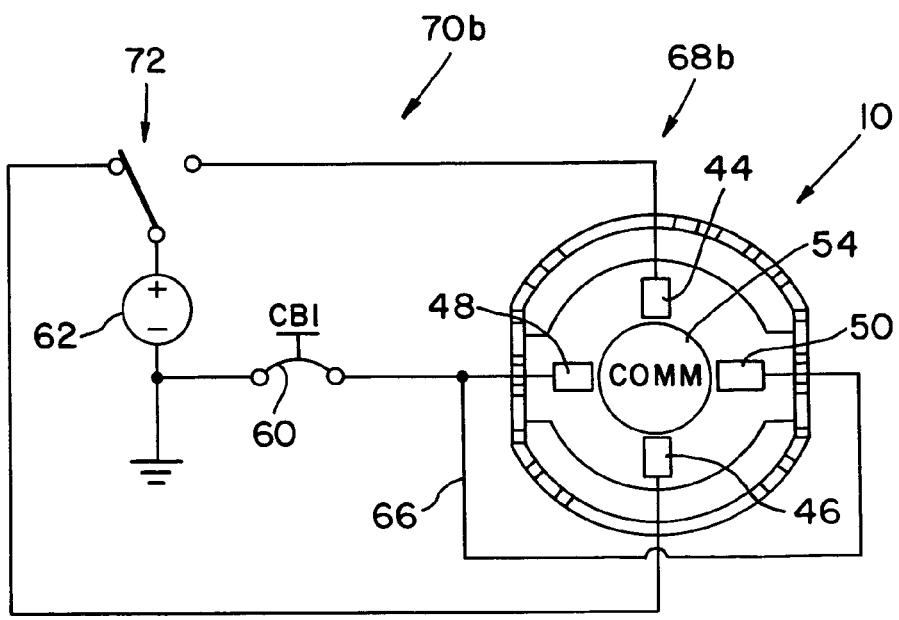
FIG. 3b is a schematic diagram of still another embodiment of a motor system of the present invention configured to operate at the second speed in the second rotational direction.

Each of circuits 70a, 70b includes a DC power supply 62 for applying a DC voltage across either brush 44 and the parallel combination of brushes 48, 50, as shown in FIG. 3a, or brush 46 and the parallel combination of brushes 48, 50, as shown in FIG. 3b. Circuits 70a, 70b may include a switch 72 for selectively applying a positive DC voltage to either brush 44 or brush 46. More particularly, switch 72 is shown in FIG. 3a in a first position in which a positive DC voltage is applied to brush 44, and a ground voltage is applied to the parallel combination of brushes 48, 50. Brush 46 is connected to commutator 54, but is not directly connected to power supply 62. Motor 10 rotates at the second, higher speed in the first rotational direction, such as clockwise, when switch 72 is in the first position. In contrast, when switch 72 is switched to a second position, as shown in FIG. 3b, a positive DC voltage is applied to brush 46, and a ground voltage is applied to the parallel combination of brushes 48, 50. Brush 44 is connected to commutator 54, but is not directly connected to power supply 62. Motor 10 rotates at the second, higher speed in a second rotational direction opposite to the first rotational direction, such as counterclockwise, when switch 72 is in the second position. Advantageously, motor 10 may rotate at approximately equal speeds in either rotational direction, i.e., at the second, higher speed. Regardless of the position of switch 72, brushes 48, 50 are electrically connected to each other by line 66 and are connected in parallel to electrical ground.

Figure 4:
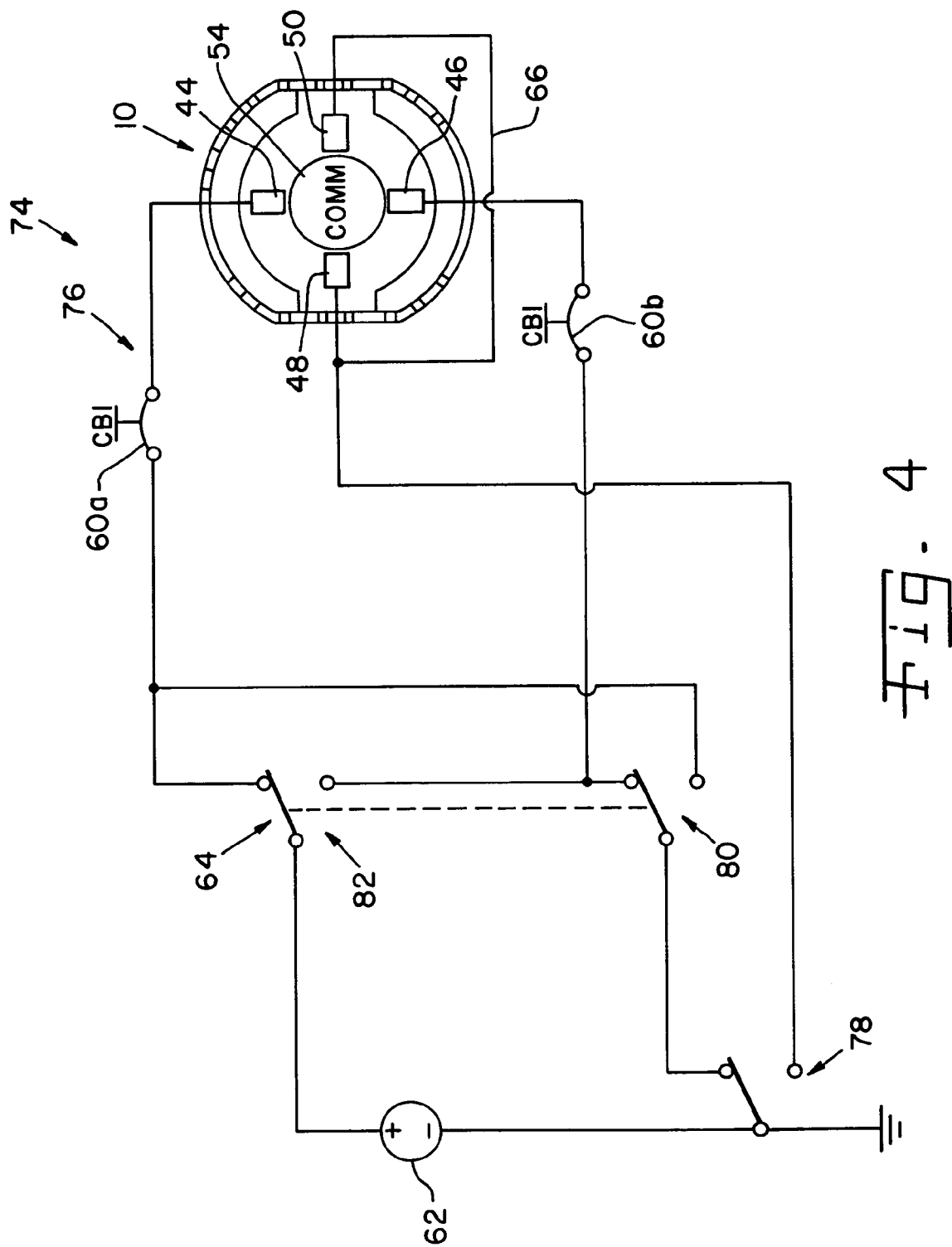
FIG. 4 is a schematic diagram of a still further embodiment of a motor system of the present invention configured to operate at the first speed in the first rotational direction.

FIG. 4 illustrates a motor system 74 that essentially combines the features of motor systems 56 and 68. Motor system 74 includes a circuit 76 for selectively operating motor 10 at either the first, lower speed or the second, higher speed at which motor 10 may be operated. Further, circuit 76 selectively operates motor 10 in either rotational direction, i.e., clockwise or counterclockwise. Circuit 76 may operate motor 10 at different speeds and in different rotational directions by applying the positive voltage and the ground voltage of power supply 62 to various subsets of brushes 44, 46, 48, 50. More particularly, circuit 76 may apply a positive DC voltage to any of three subsets of brushes, i.e., brush 44, brush 46, or the parallel combination of brushes 48 and 50. Circuit 76 may also apply a ground voltage to another one of the subsets of brushes, i.e., another one of brush 44, brush 46, and the parallel combination of brushes 48 and 50. The remaining subset of brushes, i.e., the remaining one of brush 44, brush 46, and the parallel combination of brushes 48 and 50, may not have a voltage applied directly to it, but will be electrically connected to commutator 54.

Circuit 76 includes thermal protection devices in the form of circuit breakers 60a, 60b connected in series with brush 44 and brush 46, respectively. Since any one of brush 44, brush 46, and the parallel combination of brushes 48 and 50 may not have a voltage applied directly to it, and thus may not carry current therethrough, two circuit breakers may be included in circuit 76 to ensure that at least one of the circuit breakers carries current. Alternatively, it is also possible for circuit 76 to include only a single circuit breaker connected in series with DC power supply 62.

Circuit 76 may include a DPDT switch 64 for selectively applying either a positive DC voltage or a ground voltage to either of brushes 44, 46. Circuit 76 may also include a switch 78 for selectively applying a ground voltage to either the parallel combination of brushes 48, 50 or to DPDT switch 64 for further application to brush 44 or brush 46.

Switch 78 is shown in FIG. 4 in a first position in which a ground voltage is applied to a first switch contact 80 of DPDT switch 64. DPDT switch 64 is shown in FIG. 4 in a first position in which a positive DC voltage is applied to brush 44 via a second switch contact 82 of switch 64, and the ground voltage is applied to brush 46 via first switch contact 80. Motor 10 rotates at the first, lower speed in a first rotational direction, such as clockwise, when switches 64 and 78 are in their respective first positions. In contrast, when DPDT switch 64 is switched to a second position, a positive DC voltage is applied to brush 46 via switch contact 82, and a ground voltage is applied to brush 44 via switch contact 80. Motor 10 rotates at the first, lower speed, or at a speed approximately equal to the first, lower speed, in a second rotational direction opposite to the first rotational direction, such as counterclockwise, when switch 64 is in the second position and switch 78 is in the first position. Advantageously, motor 10 may rotate at approximately equal speeds in either rotational direction at the first, lower speed.

Regardless of the position of switch 78, brushes 48, 50 are electrically connected to each other by line 66 and are connected in parallel to commutator 54. However, power supply 62 does not directly apply voltage to either of brushes 48, 50 when switch 78 is in its first position as shown in FIG. 4.

When switch 78 is in its second position, a ground voltage is applied to the parallel combination of switches 48, 50 via switch 78. First switch contact 80 is effectively removed from the current loop when switch 78 is in its second position. When DPDT switch 64 is in its first position, and switch 78 is in its second position, a positive DC voltage is applied to brush 44 via second switch contact 82, and no voltage is applied to brush 46. Motor 10 rotates at the second, higher speed in a first rotational direction, such as clockwise, when switch 64 is in its first position, and switch 78 is in its second position. In contrast, when DPDT switch 64 is switched to a second position, a positive DC voltage is applied to brush 46 via switch contact 82, and no voltage is applied to brush 44. Motor 10 rotates at the second, higher speed, or at a speed approximately equal to the second, higher speed, in a second rotational direction opposite to the first rotational direction, such as counterclockwise, when switch 64 is in the second position and switch 78 is in the second position. Advantageously, motor 10 may rotate at approximately equal speeds in either rotational direction at the second, higher speed.

In one embodiment, motor 10 rotates at approximately between 2600 and 2800 r.p.m. with no load and 12 volts applied thereto when configured to operate at the lower speed. In contrast, motor 10 rotates at approximately between 5000 and 6000 r.p.m. with no load and 12 volts applied thereto when configured to operate at the higher speed. Motor 10 may have a stall torque of 53 ounce-inches with 12 volts applied thereto when configured to operate at the lower speed, and a stall torque of 48 ounce-inches when configured to operate at the higher speed.

Circuit breakers have been disclosed herein as being used as thermal protection devices. However, it is also possible to use another type of thermal protection device, such as a positive temperature coefficient (PTC) device, in place of any or all of the circuit breakers disclosed herein.

While this invention has been described as having an exemplary design, the present invention may be further modified within the spirit and scope of this disclosure. This application is therefore intended to cover any variations, uses, or adaptations of the invention using its general principles.

What is claimed is:

1. A motor system comprising:
   a rotor;
   four brushes electrically connected to said rotor, each of said four brushes being selectively connected to said rotor in one of at least two of a plurality of different states;
   a stator including two magnetic poles; and
   a circuit configured to selectively switch each of said brushes between the at least two different states such that said circuit may:
      rotate said rotor at a first speed in a first direction by connecting a first of said brushes in a first of the states, a second of said brushes in a second of the states, and a third and a fourth of said brushes in a third of the states;
      rotate said rotor at a second speed in the first direction by connecting said first brush in the first state, said third brush and said fourth brush in the second state, and said second brush in the third state; and
      rotate said rotor in a second rotational direction opposite to the first rotational direction by connecting said second brush in the first state and at least one of said first brush, said third brush and said fourth brush in the second state.

2. The system of claim 1 wherein said two magnetic poles comprise two permanent magnets.

3. The system of claim 1 wherein the second speed is greater than the first speed.

4. The system of claim 3 wherein the second speed is approximately twice the first speed, and a stall torque at the second speed is within 10% of a stall torque at the first speed.

5. The system of claim 1 wherein the first state comprises applying a DC voltage to said brush and the second state comprises applying approximately a ground voltage to said brush.

6. The system of claim 1 wherein said circuit is configured to:
   rotate said rotor at the first speed in a first rotational direction by applying a first voltage to said first brush and a second voltage to said second brush; and
   rotate said rotor at the first speed in a second rotational direction opposite to the first rotational direction by applying the first voltage to said second brush and the second voltage to said first brush.

7. The system of claim 1 wherein said circuit is configured to:
   rotate said rotor at the second speed in a first rotational direction by applying a first voltage to said first brush, and applying a second voltage to said third brush and said fourth brush; and
   rotate said rotor at the second speed in a second rotational direction opposite to the first rotational direction by applying the first voltage to said second brush, and applying the second voltage to said third brush and said fourth brush.

8. The system of claim 7 wherein said circuit includes at most three switch elements.

9. The system of claim 1 further comprising at least one thermal protection device connected in series with at least one of said brushes.

10. The system of claim 1 wherein each of said four brushes is switchable between at least two of:
   a first voltage;
   a second voltage; and
   electrical disconnection from a voltage source.

11. The system of claim 1 wherein at least one of said four brushes is switchable between:
   a first voltage;
   a second voltage; and
   electrical disconnection from a voltage source.

12. The system of claim 1 wherein said third brush and said fourth brush are electrically connected together.

13. A motor system comprising:
   a rotor;
   four brushes electrically connected to said rotor, each of said four brushes being selectively connected to said rotor in one of at least two of a plurality of different states; and
   a circuit configured to selectively switch each of said brushes between the at least two different states such that said circuit may:
      rotate said rotor at a first speed in a first direction by connecting first of said brushes in a first of the states, a second of said brushes in a second of the states, and a third and a fourth of said brushes in a third of the states;
      rotate said rotor at a second speed in the first direction by connecting said first brush in the first state, said third brush and said fourth brush in the second state, and said second brush in the third state; and
      rotate said rotor in a second rotational direction opposite to the first rotational direction by connecting said second brush in the first state and at least one of said first brush, said third brush and said fourth brush in the second state.

14. The system of claim 13 wherein said circuit is configured to:
   rotate said rotor at the first speed in a first rotational direction by applying a first voltage to said first brush and a second voltage to said second brush; and
   rotate said rotor at the first speed in a second rotational direction opposite to the first rotational direction by applying the first voltage to said second brush and the second voltage to said first brush.

15. The system of claim 13 wherein said circuit is configured to:
   rotate said rotor at the second speed in a first rotational direction by applying a first voltage to said first brush, and applying a second voltage to said third brush and said fourth brush; and
   rotate said rotor at the second speed in a second rotational direction opposite to the first rotational direction by applying the first voltage to said second brush, and applying the second voltage to said third brush and said fourth brush.

16. The system of claim 13, further comprising a stator including two permanent magnets, a first end of a first of said magnets opposing a first end of a second of said magnets, a second end of said first magnet opposing a second end of said second magnet, said four brushes disposed between said magnets, a first of said brushes being disposed approximately midway between said first end and said second end of said first magnet, a second of said brushes being disposed approximately midway between said first end and said second end of said second magnet, a third of said brushes being disposed proximate said first end of said first magnet and said first end of said second magnet, a fourth of said brushes being disposed proximate said second end of said first magnet and said second end of said second magnet.

17. The system of claim 16 wherein said first end of said first magnet is separated from said first end of said second magnet by a first gap, said second end of said first magnet being separated from said second end of said second magnet by a second gap.

18. The system of claim 17 wherein said third brush is disposed along said first gap and said fourth brush is disposed along said second gap.

19. The system of claim 16 wherein said first brush and said second brush are diametrically opposed to one another, and said third brush and said fourth brush are diametrically opposed to one another.

20. The system of claim 16 further comprising a commutator electrically connected to each of said brushes, said four brushes being substantially evenly spaced around a circumference of said commutator.

* * * * *

UNITED STATES PATENT AND TRADEMARK OFFICE
CERTIFICATE OF CORRECTION

PATENT NO. : 7,071,643 B2
APPLICATION NO. : 10/946290
DATED : July 4, 2006
INVENTOR(S) : Justin M. Prevo et al.

Page 1 of 1

It is certified that error appears in the above-identified patent and that said Letters Patent is hereby corrected as shown below:

Claim 13, Column 7, Line 26, after "connecting" insert --a--.

Signed and Sealed this

Twenty-eighth Day of November, 2006

JON W. DUDAS
*Director of the United States Patent and Trademark Office*